(12) United States Patent
Lee et al.

(10) Patent No.: US 6,337,026 B1
(45) Date of Patent: Jan. 8, 2002

(54) LEUKOCYTE REDUCTION FILTRATION MEDIA

(75) Inventors: Eric K. Lee, Acton; Paul J. Vernucci, Billerica; Samuel C. Williams, Acton, all of MA (US)

(73) Assignee: Whatman Hemasure, Inc., Marlborough, MA (US)

( * ) Notice: Subject to any disclaimer, the term of this patent is extended or adjusted under 35 U.S.C. 154(b) by 0 days.

(21) Appl. No.: 09/264,276

(22) Filed: Mar. 8, 1999

(51) Int. Cl.[7] .......................... B01D 37/00; B01D 39/00; B01D 39/02
(52) U.S. Cl. ................. 210/767; 210/435; 210/446; 210/483; 210/488; 210/490; 210/491; 210/503; 210/504; 210/505; 210/508; 428/323; 428/327
(58) Field of Search .................. 210/435, 446, 210/483, 488, 490, 491, 503, 504, 505, 508, 509, 645, 767; 428/323, 327, 297.4

(56) References Cited

U.S. PATENT DOCUMENTS

| | | | |
|---|---|---|---|
| 4,073,732 A | 2/1978 | Lauer et al. | 210/491 |
| 4,115,277 A | 9/1978 | Swank | 210/436 |
| 4,170,056 A | 10/1979 | Meyst et al. | 29/163.5 F |
| 4,246,107 A | 1/1981 | Takenaka et al. | 210/806 |
| 4,283,289 A | 8/1981 | Meyst et al. | 210/448 |
| 4,330,410 A | 5/1982 | Takenaka et al. | 210/767 |
| 4,416,777 A | 11/1983 | Kuroda et al. | 210/446 |
| 4,701,267 A | 10/1987 | Watanabe et al. | 210/806 |
| 4,880,548 A | 11/1989 | Pall et al. | 210/767 |
| 4,923,620 A | 5/1990 | Pall | 210/767 |
| 4,925,572 A | 5/1990 | Pall | 210/767 |
| 4,936,998 A | 6/1990 | Nishimura et al. | 210/638 |
| 5,190,657 A | 3/1993 | Heagle et al. | 210/645 |
| 5,229,012 A | 7/1993 | Pall et al. | 210/767 |
| 5,258,127 A | 11/1993 | Gsell et al. | 210/767 |
| 5,290,449 A | 3/1994 | Heagle et al. | 210/503 |
| 5,298,165 A | 3/1994 | Oka et al. | 210/645 |
| 5,344,561 A | 9/1994 | Pall et al. | 210/508 |
| 5,362,406 A | 11/1994 | Gsell et al. | 210/767 |
| 5,407,581 A | 4/1995 | Onodera et al. | 210/654 |
| 5,443,743 A | 8/1995 | Gsell | 210/767 |
| 5,454,946 A | * 10/1995 | Heagle et al. | 210/503 |
| 5,498,336 A | 3/1996 | Katsurada et al. | 210/496 |
| 5,501,795 A | 3/1996 | Pall et al. | 210/508 |
| 5,591,337 A | * 1/1997 | Lynn et al. | 210/489 |
| 6,048,464 A | 4/2000 | Tanaka et al. | 210/767 |

* cited by examiner

*Primary Examiner*—John Kim
(74) *Attorney, Agent, or Firm*—Heslin Rothenberg Farley & Mesiti , P.C.; Candice J. Clement, Esq.

(57) ABSTRACT

A high capacity leukocyte depletion filtration media incorporates a high specific surface area components with a matrix of fibers, yielding a filtration medium that removes leukocytes by at least 99.99%. The filtration medium uses a significantly low weight ratio of high specific surface area components to the matrix of fibers. The high specific area creates a multitude of adhesion sites for leukocytes while the low weight ratios allow good filtration flow rates. The filtration medium is incorporated into a filter device for removing leukocytes from biological fluids.

51 Claims, 3 Drawing Sheets

LEUKOCYTE REDUCTION FILTRATION MEDIA

FIELD OF THE INVENTION

The invention relates to the filtration of a blood products and more specifically, to a filtration media for the removal of leukocytes from blood products.

BACKGROUND OF THE INVENTION

The technology of human blood transfusion has improved significantly in recent years. Unlike early transfusion practices that involved the transfusion of units of whole blood, a recipient will now typically only receive that fraction of whole blood that is needed under the particular circumstances. For example, a patient in need of red blood cells can receive a transfusion of packed red cells (pRBC) or concentrated red cells (cRBC) and a patient in need of platelets can receive a transfusion of platelet concentrate, while a patient in need of increased blood volume can receive a transfusion of plasma or a plasma product. For transfusion purposes, a donated whole blood supply is typically separated into the aforementioned three components by centrifugation. In addition to these basic components, whole blood also contains various types of white blood cells, collectively known as leukocytes, which are present in substantial levels in both RBC and platelet suspensions.

Leukocytes, which include for example, granulocytes, macrocytes and lymphocytes, function to provide protection against a wide range of bacterial and viral infections. As such, the transfusion of a leukocyte-containing product might be expected to be beneficial in the therapy of immunosuppressive diseases. To the contrary however, research has shown that patients who received granulocyte transfusions will quickly develop such adverse effects as rigor, nausea, headache, and high fever, and shortly thereafter, will reject the transfused cells. In addition, it is known that certain viruses are resident in leukocytes and as a result, transfusion of infected cells to an immunosuppressed patient has the potential of inducing a life-threatening viral disease. Graft versus Host disease, as well as certain viruses, such as HIV, HTLV1 and CMV, among others, are now believed to be transmitted by the transfusion of infected leukocytes. Although a unified world-wide standard for acceptable leukocyte levels in donated blood products has yet to emerge, it is generally accepted that a majority of severe adverse effects may be reduced or prevented if the leukocyte content is reduced to, for example, less than one to five million leukocytes per unit of red cells transferred. Accordingly, it is therefore quite desirable to provide a clinically effective means for significantly and efficiently reducing the leukocyte content of donated biological fluids, namely, whole blood and blood component products.

A typical unit of pRBC averaging about 350 mL in volume contains between about $1 \times 10^9$ and $5 \times 10^9$ leukocytes. Differences in the leukocyte content are largely attributable to differences in the donor. According to internationally accepted standards, a unit of RBC must contain no more than $10^6$ leukocytes for it to qualify as being leukocyte depleted. The corresponding leukocyte depletion rate required is thus on the order of 99.9% and 99.99%. Commercially viable filters should routinely deliver the higher level of leukocyte depletion to accommodate for normal variations in the source, filtration conditions, and age of the blood being filtered.

Various methods for removing leukocytes from biological fluids are known in the art and include for example, repeated centrifugation, saline washing, filtration and agglutinant incorporation/sedimentation. Of these methods, filtration has been accepted as the removal technique of choice. A typical leukocyte filtration process involves passing a leukocyte-rich blood product through a filter comprised of a material that adsorbs leukocytes and/or entraps them within the filter and obtaining a leukocyte-depleted filtered product without altering the physical and therapeutic characteristics of other blood components present in the product.

Leukocyte filtration of blood products may rely primarily on two mechanisms: sieving and adhesion. Sieving is typically caused by the mechanical entrapment of leukocytes within a filter material, while adhesion typically results from interactions between the leukocyte cell surface and the filter material itself. Conventional leukocyte reduction devices may involve a depth filtration medium that is comprised of various diameter fibers entwined into a web-like matrix, which provides for tortuous flow paths that offer different resistance to cells of different sizes and shapes, as well as substantial internal surface areas for preferential leukocyte adhesion. To accomplish acceptable selectivity between leukocytes and red blood cells, media of this type typically exhibit relatively small average pore sizes; thus resulting in modest flow rates through the filtration device.

U.S. Pat. No. 5,454,946 (the "'946 patent") describes a leukocyte filter material that is comprised of a matrix of interlocked fibers having spaces between adjacent interstices wherein fibrillated particles of polymeric material are disposed within the spaces and a thermoplastic binder is disposed at least at cross-over sections of the matrix fibers. This patent states that the weight ratio of the fibrillated particles to the matrix fibers must be between about 1:99 and 40:60, and especially between about 5:95 and 40:60, and preferably less than about 20:80. If that ratio is less than about 3:97, the additional surface area supplied by the fibrillated particles is marginal for desired leukocyte filtration, and at below about 1:99, the surface area is simply not sufficient to achieve a minimum desired depletion of leukocytes, i.e., at least a 70% depletion. This patent further teaches that with increasing ratios of fibrillated particles to matrix fibers, the depletion of leukocytes from blood will be correspondingly increased, such that at a ratio of about 5:95, the depletion percentage will be close to about 90%, and at about 10:90, the depletion may be as high as about 99%, for some modes of blood filtration.

Thus, the '946 patent teaches that the filter media described therein achieves minimum desired leukocyte depletion if the weight ratio of fibrillated fibers to matrix fibers is within a specifically defined range, about 1:99 to 40:60. Moreover, leukocyte depletion rates increase with increasing weight ratios with optimal performance occurring at a weight ratio of 10:90. Conversely, leukocyte depletion rates decrease with decreasing weight ratio and that insufficient leukocyte reduction occurs at a weight ratio of fibrillated fibers to matrix fibers of less than about 1:99. According to the '946 patent, the desired minimum leukocyte reduction rate is 70%. In reality, however, leukocyte depletion devices, in order to meet commercial and medical requirements, typically should achieve leukocyte reduction rates of 99.9% or higher. Therefore, the '946 patent does not describe a leukocyte depletion device which achieves commercially and medically acceptable leukocyte filtration rates with a weight ratio of fibrillated fibers to matrix fibers of less than about 1:99.

The '946 patent also describes the use of fibrillated particles having a surface area of 30 or 50 or 70 square meters per gram in a filtration media and suggests that the use of surface area particles up to 100 square meters per gram may be used in a way where the particles are still retained in the matrix. However, the '946 patent does not teach or contemplate how one may achieve acceptable and/or superior leukocyte reduction using fibrillated particles of a higher surface area such as 100 m²/g, or even how to obtain fibrillated particles of such a high surface area.

SUMMARY OF THE INVENTION

We have discovered a way to achieve leukocyte reduction rates of substantially greater than 70% even when using a weight ratio of fibrillated fibers or particles to matrix fibers of less than or equal to about 1:100. We have also discovered that leukocyte reduction rates of 99.99% and higher may be achieved at a weight ratio of less than or equal to about 1:100 including, but not limited to, weight ratios below 1:200. We have also found a way to incorporate a high-specific surface area component beyond those previously used, to achieve an unexpected and advantageous increase in leukocyte removal, contrary to the teachings of the '946 patent. We have found a way to increase the surface area of fibrillated particles to an ultra-high level and to incorporate those fibers into fiber matrix to achieve commercially and medically acceptable leukocyte reduction rates. While the art teaches a number of different approaches to leukocyte reduction filter materials, and attempts to identify key parameters governing performance of those materials, it has not hitherto been recognized that incorporating a very high specific internal surface area component into a medium at extremely low weight ratios can lead to significantly improve leukocyte depletion performance.

The present invention provides a high capacity leukocyte reduction filtration medium for the effective and efficient reduction of the leukocyte content of donated blood products, prior to transfusion. As used herein, the term "blood products" is intended to include whole blood and components thereof, such as, for example, plasma, red blood cells and platelets.

The construction of the filtration medium of the present invention incorporates a high specific surface area component into a relatively open porous fibrous matrix, thereby creating a multitude of leukocyte adhesion sites, while at the same time providing a fast filtration flow rate. This construction promotes the adsorption of leukocytes onto the filtration medium, and compliments sieving as a means of leukocyte removal, while allowing red blood cells to flow through the filtration medium with minimal interference.

In one embodiment, the principles of the present invention provide a high capacity leukocyte reduction filtration medium comprising a matrix of fibers and a plurality of components distributed amongst the matrix fibers, wherein the weight ratio of the components to the matrix fibers to is less than or equal to about 1:100, preferably less than about 1:150, and more preferably, less than about 1:200.

The components distributed amongst the matrix fibers have a high specific surface area, much greater than that of the matrix fibers. The high specific surface area components provide the medium with the capability of removing 99.99% or more of leukocytes present in a blood product. The high surface area components may be in the form of highly fibrillated fibers, fibrils, or highly fibrillated particles preferably having spherical or rounded shapes. Preferably, the components such as the highly fibrillated fibers or fibrils have a high specific surface area, e.g., at least about 100 m²/g, and more preferably, at least about 120 m²/g. The average diameter of the fibrils is preferably less than about 0.05 µm, and more preferably, less than about 0.035 µm. The components function to increase the surface area of the filtration media and increase the effective surface area for leukocyte adhesion. Thus, the components may comprise any configuration and/or materials that will result in increased surface area and leukocyte adhesion sites. Any such components are intended to be within the scope of this invention.

High performance filtration systems are designed with three key objectives: (1) consistently meeting accepted standards for the leukocyte depleted blood product; (2) minimizing the amount of loss of the blood product due, for example, to capillary hold up in the filter medium; and (3) completing the filtration within a short period of time relative to standard operating procedures. A filter medium with high intrinsic leukocyte removal capacity while offering low resistance to passage of the blood product helps accomplish these objectives in a relatively small filter device.

With this combination of increased specific surface area of the components on the leukocyte reduction filtration medium of the present invention may provide at least a ten thousand fold reduction of leukocytes, i.e., a 99.99% efficiency in a filtered blood product and a high flow rate of blood product whereby a 350 mL unit of red blood cells, for example, may be processed in less than about 20 minutes.

The principles of the present invention also provide a method for removing leukocytes from blood products. In one embodiment, the method comprises passing a leukocyte-containing blood product through a leukocyte reduction filtration medium comprising a matrix of fibers and a plurality of components distributed amongst the fibers as described herein and recovering a leukocyte-depleted blood product.

DESCRIPTION OF THE DRAWINGS

Various features and advantages of the present invention will become readily apparent upon reference to the following detailed description of the invention, when read in conjunction with the accompanying drawings wherein.

DETAILED DESCRIPTION OF THE PREFERRED EMBODIMENT

Figure 1:
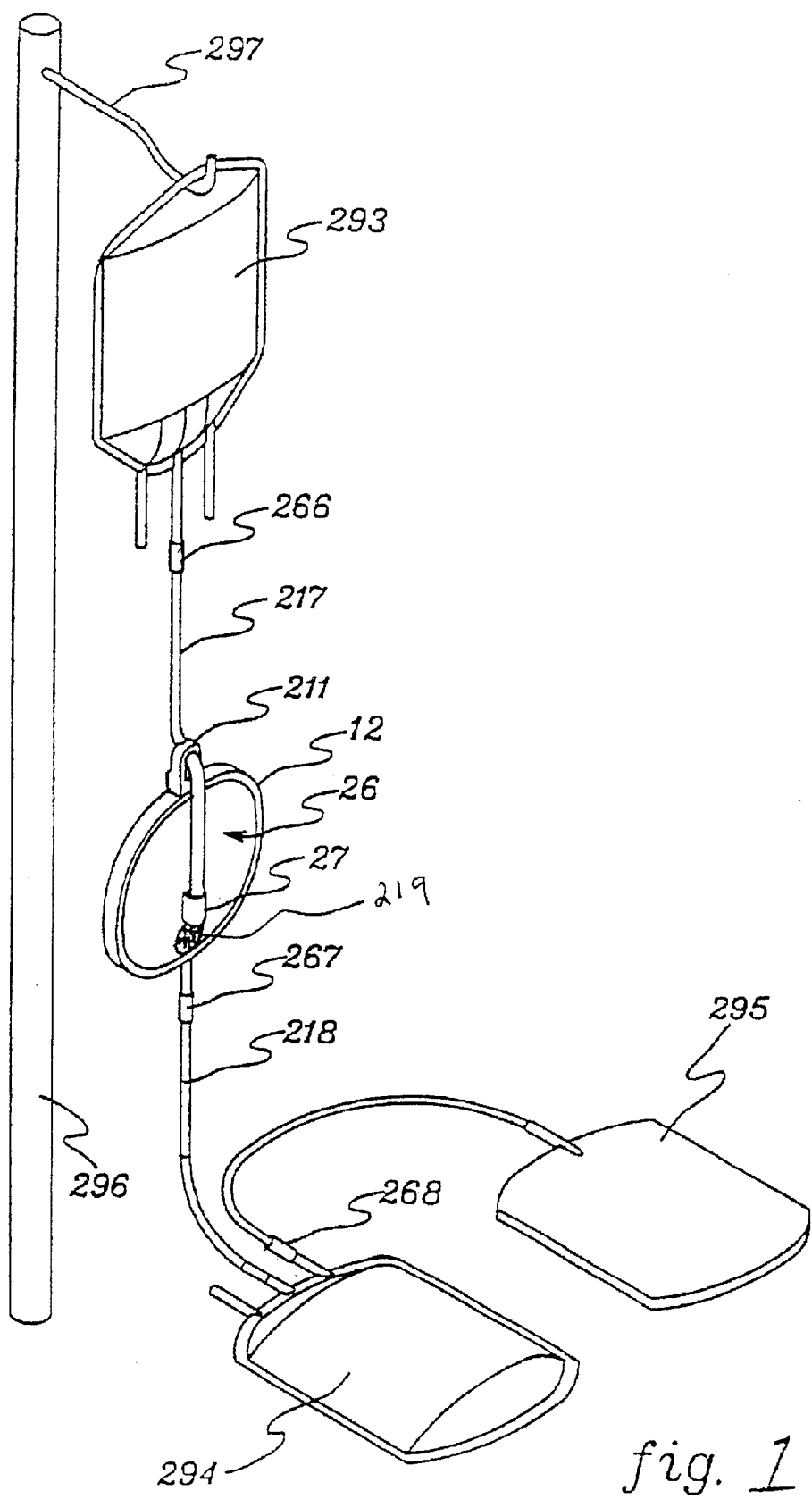
FIG. 1 is a perspective view of a biological filtration system in operational assembly comprising a blood supply bag, a filter device incorporating a leukocyte reduction filtration medium in accordance with the present invention, and a blood receiving bag.

Although this invention is susceptible to embodiment in many different forms, preferred embodiments of the invention are shown. It should be understood, however, that the present disclosure is to be considered as exemplary of the principles of this invention and is not intended to limit the invention to the embodiments illustrated.

The high capacity leukocyte reduction filtration medium of the present invention is obtained with a construction that comprises a matrix of fibers and a plurality of components distributed amongst the fibers, wherein the weight ratio of the components distributed amongst the matrix fibers to the matrix fibers is less than or equal to about 1:100, preferably less than about 1:150, and more preferably, less than about 1:200. The components distributed amongst the matrix fibers have a high specific surface area of at least about 100 $m^2/gm$, and preferably, greater than about 120 $m^2/gm$. This high surface area may be achieved by subjecting the components to high shear forces, typically by placing the same in a mechanical agitator such as a high speed blender or a genre of equipment used in the fiber and papermaking industries known as refiners. Other types of agitators that can provide similar mechanical action on the fiber may also be used.

To achieve the ultra-high specific surface area in a fibrillated component requires careful matching of the starting material with the mechanical shear in such a way that secondary features such as branches and micro fibrils are created without excessive damage to the primary structure. Synthetic polymers, in particular highly oriented textile fibers, respond to mechanical stress typically by first splitting in the longitudinal axis of the fiber before breaking into shorter lengths. This is desirable because it favors maximizing surface area creation while maintaining integrity of the base fiber, which in turn improves retention of the component in the filter media of the present invention.

Commercial sources of fibrillated components are known in the art. For example, a series of modified polyacrylonitrile with different degrees of fibrillation (and thus specific areas) are available from Sterling Fibers (Santa Rosa, Fla.) in the form of chopped fibers supplied as wet pulp. In accordance with the principles of the present invention, filter media are preferably made using fibers with higher degrees of fibrillation, and even more preferably from fibrous pulps subject to additional controlled mechanical shear as described above.

Alternative means of fabricating ultra-high surface area components are also possible, for example by precipitation of a solution of a polymer under a variety of high-shear conditions. The present invention may be advantageously practiced so long as the dual requirements of high specific surface area and adequate mechanical integrity are met.

Examples of suitable materials for the high specific surface area components distributed amongst the matrix fibers include, but are not limited to, fibers or microfibers having inherently small diameters or those that are capable of being fibrillated, branched or bifurcated progressively. Particles, from spherical to irregularly shaped, may also be suitable geometries as high specific area components or as their precursors. The composition of such materials includes for example, polyamides, acrylics, polyesters, polyolefins, and cellulosic materials such as cellulose esters; a preferred material comprises polyacrylonitrile or a copolymer thereof.

The filtration medium may be made of organic, inorganic, natural or synthetic materials. Examples of suitable materials for the fiber matrix are known in the art and include, but are not limited to, woven and non-woven materials made from, for example, rayon, cotton, wool, glass, carbon, silk, acrylics, polyolefins, polyesters, polyacrylonitrile, acrylate polymers or copolymers, polystyrene, polysulfones, polyethers, polyamides, polyarylene oxides, polyarylene sulfides, and copolymers thereof. A preferred embodiment of the present invention incorporates glass as the matrix fiber.

The filtration medium of the present invention may be formed by any conventional method such as, for example, by a wet-laid or dry-laid process; by knitting or weaving with monofilament or multifilament fibers or yarns; or by forming a packed column or slab by a dry or wet packing process. The matrix fibers may be chemically, mechanically, thermally, or otherwise bonded together to form a porous sheet, and/or they may be encapsulated with a binder added during formation of the matrix or applied in a subsequent processing step. The amount of binder added to the medium formulation should be such that it imparts mechanical stability for ease of handling, but not be present in such a concentration as to make the medium unmanageable or stiff.

The high specific surface area components to be distributed amongst and throughout the matrix fibers may be introduced into the structure by co-formation with the fiber matrix or by post-treatment of the formed matrix to obtain the spatial and surface modifications that result in vastly increased internal surface area and increased leukocyte adhesion sites.

An exemplary method for forming the medium involves a one-step process wherein the matrix fibers and the components to be distributed amongst the matrix fibers are mixed as a slurry to a desired solids content and then poured into a mold to form a sheet of medium. To facilitate drying, the sheet may, for example, be heated by a variety of methods well known in the art.

When the medium formulation includes a binder, it may be added to the initial slurry or it may be applied to the formed medium in a subsequent processing step. Suitable binder materials include, but are not limited to, thermosetting, thermoplastic, homopolymers or copolymers, and desolubilized gums. Examples of suitable thermosetting and thermoplastic binders include polyvinyl acetate, polyvinyl chloride, polyacrylics and polyacrylates, polyacrylonitrile, polybutadiene, polyethylene, polyisoprene, polyvinyl acetate ethylene, polyvinyl acetate acrylate, polystyrene butadiene, and/or a cross-Linked derivative thereof. An example of suitable desolubilized gums include polyvinyl alcohol. In a preferred embodiment, the medium includes a binder comprised of polyvinyl alcohol or a cross-linked derivative thereof.

The filtration medium of the present invention is suitable for use in a variety of devices which in turn, may be built into systems comprising blood bags, conduits, clamps, blood collection systems, apheresis systems and other components, configured variously to meet the needs of reducing the leukocyte content of blood components in the course of blood collection and componentization. Such systems may, for example, be designed to filter red blood cells, with or without added preservatives, of different age after collection; whole blood, with or without anticoagulants, not yet separated into components; or platelets. The filter device may be connected to the blood product to be leukocyte depleted by sterile docking, or it may be equipped with spike connectors, or be built into the blood collection set.

Where the medium is present in a filter device as a filter sheet or pad, the device preferably incorporates or a plurality of layers of the medium. Preferably, the thickness of the medium layers will be between about 0.7 and 1.5 mm. The device may comprise a housing having an inlet and an outlet and one or more layers of leukocyte reduction filtration medium disposed therein. In addition, the filter device may include other filter medium, upstream and/or downstream from the leukocyte reduction medium. The device may include for example, an upstream prefilter to remove gels and/or microaggregates and optionally a downstream filter to remove any debris or solids that may be present in the filtrate stream.

As referred to herein, the terms upstream, top or up refer to a location of the flow of liquid prior to filtration through the filter elements within a filtration device. Conversely, the terms downstream, bottom or down, refer to a location of the flow of liquid after filtration through filter elements within the filtration device.

Accordingly, the principles of the present invention also provide a method for removing leukocytes from blood products, wherein the method comprises passing a leukocyte-containing blood product through a leukocyte reduction filtration medium comprising a matrix of fibers and a plurality of high specific surface area components distributed amongst the fibers, wherein the weight ratio of the high specific surface area components distributed amongst the matrix fibers to the matrix fibers is less than or equal to about 1:100. The method may comprise introducing a leukocyte-containing blood product into an inlet of a filter device having a leukocyte reduction filtration medium comprising a matrix of fibers and a plurality of components distributed amongst the fibers, wherein the weight ratio of the high specific surface area components distributed amongst the matrix fibers to the matrix fibers is less than or equal to about 1:100, such that leukocytes are retained within the medium and a leukocyte-depleted blood product exits the device through an outlet of the housing for recovery.

EXAMPLES

The principles of the present invention are herein described in more detail in the following examples which are provided by way of illustration and not by way of limitation.

EXAMPLE 1

A layer of the leukocyte filtration medium was formed in a standard hand sheet mold. The sheet was formed with 88.47 weight percent (wt.%) of 1.8 $\mu$m diameter micro-glass fiber (Type 475-108B, Johns Manville, Waterville, Ohio.), 9.83 wt. % of 0.65 $\mu$m diameter micro-glass fiber (Type 475-106, Johns Manville, Waterville, Ohio.) and 1.7 wt. % of 10 $\mu$m polyvinyl alcohol (PVA) binder fiber (Kuralon VPB 105-2, Kuraray, Osaka, Japan). The slurry was prepared at a 0.05% fiber solids content in water and then formed into a sheet weighing 124 g/m$^2$. The sheet was dried on a sheet dryer at approximately 135° C. resulting in a thickness of approximately 0.9 mm.

The hand sheet was die cut into 40- mm diameter disks and eight such disks were inserted and sealed into a columnar filter housing with silicone adhesive. A layer of pre-filter medium (Grade 5300, Reemay, Inc., Old Hickory, Tenn.) was placed at the inlet of the housing to aid in gel and microaggregate removal. Human packed red blood cells (pRBC, with AS-1 preservative solution) was fed through the device into a receiving blood bag. The distance from the feed pRBC to the receiving bag was 60 inches. The pRBC filtrate volume was monitored over time and samples of the filtrate were obtained at certain filtrate volumes for leukocyte counting. The minimum detection limit for leukocyte counting in each of the following examples was about 100 cells/mL.

EXAMPLE 2

Hand sheets equivalent to those of Example 1, without the PVA binder fibers ( i. e., 90 wt. % of 1.8 $\mu$m micro-glass and 10 wt. % of 0.65 $\mu$m micro-glass) were prepared and tested in a housing according to the protocol of Example 1.

EXAMPLE 3

Fibrillated acrylic fibers in the form of an acrylonitrile vinyl acetate copolymer (90% polyacrylonitrile, 10% polyvinyl acetate) supplied in the form of a wet pulp (CFF fibrillated fiber type 114-3, Sterling Fibers, Santa Rosa, Fla.) were refined to obtain a BET surface area of 120 m$^2$/g. Hand sheets of approximately 0.9 mm in thickness and similar to those of Example 1, but including the fibrillated acrylic pulp were prepared and tested in a housing according to the protocol of Example 1. The amount of acrylic pulp used is such that a weight ratio of the fibrillated fibers to matrix fibers is about 1:100. The results of Examples 1–3 are provided in Table I. The leukocyte depletion rates were calculated based on a pre-filtration leukocyte content of 1×10$^9$ per 350 mL unit of RBC's, which represents a typical minimum leukocyte content for such a unit.

TABLE I

| Filtration Medium | Number of Layers of Filtration Medium | Red Blood Cell Volume Filtered (mL) | Flow Time (min) | Filtrate Leukocyte Count (cells/mL) | Leukocyte Depletion Rate (%) |
|---|---|---|---|---|---|
| Example 1 | 8 | 70 | 4.4 | 3,400 | 99.88 |
| Example 2 | 8 | 70 | 8.9 | 1,000 | 99.965 |
| Example 3 | 8 | 70 | 6.9 | <100 | 99.999 |

EXAMPLE 4

To illustrate the difference in leukocyte capture efficiency resulting from the use of high specific surface area fibrillated components, Examples 1 and 3 were repeated with half as many layers of medium as previously used. The results for Example 4 are provided in Table II.

TABLE II

| Filtration Medium | Number of Layers of Filtration Medium | RBC Volume Filtered (mL) | Flow Time (min) | Filtrate Leukocyte Count (Cells/mL) | Leukocyte Depletion Rate (%) |
|---|---|---|---|---|---|
| Example 1 | 4 | 70 | 2.1 | 71,600 | 97.5 |
| Example 3 | 4 | 70 | 3.0 | 400 | 99.986 |

Again, the addition of the fibrillated acrylic fibers resulted in a 1.4-fold increase in flow time but removed leukocytes much more efficiently.

EXAMPLE 5

Examples 1 and 3 were again repeated, this time filtering twice the volume of RBC. An additional comparison was performed using a filter medium produced in accordance with the prior art as described in U.S. Pat. No. 5,290,449, and deployed in a previous commercial leukocyte depletion device. (LeukoNet™, HemaSure Inc., Marlborough, Mass.). A test device was prepared using two layers of that filter medium. Two other test devices were also prepared containing four layers each of the media generated from Examples 1 and 3. All test devices were evaluated with aliquots from the same unit of pRBC with AS-1 preservative solution.

TABLE III

| Filtration Medium | Number of Layers of Filtration Medium | Thickness of Filter Stack (mm) | RBC Volume Filtered (mL) | Flow Time (min) | Filtrate Leukocyte Count (cells/mL) | Leukocyte depletion rate (%) |
| --- | --- | --- | --- | --- | --- | --- |
| LeukoNet ™ Medium | 2 | 2.7 | 140 | 29.5 | 1,240,000 | 57 |
| Example 1 | 4 | 3.4 | 140 | 6.1 | 884,000 | 69 |
| Example 3 | 4 | 3.4 | 140 | 10.5 | 400 | 99.986 |

Clearly, the filter medium of the prior art exhibited higher resistance to flow compared with filter media of the present invention as described in Example 3. The leukocyte removal efficiency of the prior art filter media was also significantly lower than that of the media of the present invention, even accounting for differences in overall filter stack thickness.

A suitable method for determining the surface area of a fibrillated acrylic fiber such as that used in the examples herein is described below, with reference to Example 3. In Example 3, five grams of the CFF fibrillated acrylic fibers were mixed with about 200 mL of deionized water and added to a Waring-type blender and blended on the high setting (approx. 20,000 RPM) for about 30 seconds. The slurry was then de-watered using a Buchner funnel containing a 40-mesh sieve under a vacuum of 10" mercury to a solids content of 10 wt. %. 50 mL of deionized water and 50 mL of ethanol were then added to the denatured slurry and stirred for about five minutes. The liquid was then decanted from the slurry. The slurry was then mixed with 25 mL deionized water and 75 mL of ethanol, stirred for about five minutes, and the liquid was again decanted. This mixing, stirring and decanting procedure was repeated five more times first using 100 mL of ethanol, then using 50 mL of ethanol and 50 mL of hexane, then with 25 mL of ethanol and 75 mL of hexane, then with 100 mL of hexane, and finally with another 100 mL of hexane. The remaining CFF product was transferred into a crystallizing dish and then placed with a desiccant in a vacuum oven (25" mercury) at ambient temperatures and dried at full vacuum until a constant weight product was achieved. The surface area of the CFF fibrets was then measured with a Micromeritics FlowSorb II 2300 using the BET single point method to be 121 $m^2$/gm.

EXAMPLE 6

A filter material (Reemay Grade 5600) was cut into 6.73 cm disks and two such disks were inserted into an acrylic inlet housing designed to provided a radial seal with the circumference of the medium, and to provide even distribution of fluid flow to the filter medium. Filtration medium made in accordance with the procedure in Example 3 was prepared on a Fourdrinier machine from a fiber slurry of approximately 0.6 wt. % solids. The medium was cut into 6.73 cm disks and seven such disks of 0.9 mm thickness were inserted into the acrylic inlet housing. A final particle screen (Hollytex 3242) was placed on the stack and an outlet housing designed to allow drainage of fluid away from the medium was ultrasonically welded onto the inlet housing to provide a fluid-tight seal. One unit of packed red blood cells (3-day AS-1, American Red Cross, Dedham, Mass.) was connected to the inlet of the filter housing with sufficient length of 3.2 mm diameter polyvinylchloride tubing such that the distance from the top of the RBC unit to the inlet of the filter housing was 46 cm. The filter outlet was connected to a receiving Go bag with 107 cm of tubing. The assembly was hung vertically from the RBC unit, and the RBC's were allowed to pass through the filter into a collection bag. The total filtration time was 13 minutes and 93% of the initial RBC's were recovered in the receiving bag. The leukocyte count of the unit was $2.7 \times 10^9$ and that of the filtered product was $3.5 \times 10^4$, resulting in a leukocyte depletion rate of 99.999%.

EXAMPLE 7

Filtration medium was prepared as in Example 6, but with acrylic pulp in an amount resulting in a weight ratio of fibrillated fibers to matrix fibers of about 1:217. The medium was assembled and tested as in Example 6. The total filtration time was 18 minutes and 91% of the initial RBC's were recovered in the receiving bag. The leukocyte count of the initial unit was $3.3 \times 10^9$ and that of the filtered product was $3.3 \times 10^4$, resulting in a leukocyte depletion rate of 99.999%.

EXAMPLE 8

A filter assembly as described in Example 7 was prepared with 2 layers of a spunbound polyester non-woven (LDH 7118, Mid-West Filtration, Chicago, Ill.) in place of the two layers of Reemay 5600. The assembly was tested as described in Example 9 with one unit of packed red blood cells (14 day AS-1, ARC, Dedham, Mass.). The total filtration time was 21 minutes and 93% of the initial RBC's were recovered in the receiving bag. The leukocyte count of the initial unit was $4.3 \times 10^9$ and that of the filtered product was $4.0 \times 10^4$, resulting in a leukocyte depletion rate of 99.999%.

EXAMPLE 9

A filter assembly as described in Example 7 was prepared with 4 layers of an air-laid polyester non-woven (M1523, Freudenberg Nonwovens, Lowell, Mass.) in place of the Reemay Grade 5600. The assembly was tested as described in Example 8 with one unit of packed red blood cells (13 day AS-1, ARC, Dedham, Mass.). The total filtration time was 37.5 minutes with an RBC recovery of 91%. The leukocyte count of the initial unit was $2.7 \times 10^9$ and that of the filtered product was $1.65 \times 10^5$, resulting in a leukocyte depletion rate of 99.994%.

Examples of other leukocyte reduction filtration medium compositions that may be prepared in accordance with the principles of the present invention include, but are in no way limited to, micro-glass fibers and fibrillated acrylic fibers distributed amongst the matrix fibers (resulting in a weight ratio of fibrillated fibers to matrix fibers of about 1:109); micro-glass fibers and components, e.g. fibrillated acrylic fibers (resulting in a weight ratio of components distributed amongst the matrix fibers to matrix fibers of about 1:105) along with 5.0 wt. % PVA; micro-glass fibers, and fibrillated acrylic fibers (resulting in a weight ratio of components distributed amongst the matrix fibers to matrix fibers of about 1:161) along with 3.9 wt. % PVA; and micro-glass fibers and fibrillated acrylic fibers (resulting in a weight ratio of components distributed amongst the matrix fibers to matrix fibers of about 1:217) along with 1.7 wt. % PVA.

Various filtration systems for removing leukocytes from blood products may incorporate the filtration medium of the present invention. Such systems are described in WO 98/39080, WO 97/09106, U.S. Pat. No. 5,472,605, the entire disclosure of which is incorporated herein by reference.

The aforementioned examples show that using the principles of the present invention unexpected leukocyte depletion rates of 99.99% may be even when using a weight ratio of components to matrix fibers of about 1:100 and below including, but not limited to, about 1:217. These results have been obtained contrary to the teachings of the prior art that insufficient leukocyte reduction, i.e., less than 70%, occurs at a weight ratio of fibrillated fibers to matrix fibers of less than or equal to about 1:99. Accordingly, the present invention provides for superior leukocyte depletion rates of 99.99% using weight ratios of components to matrix fibers of 1:100 and below, including about 1:150 and below, also including about 1;175 and below, and further including about 1:200 and below, and even further including about 1:217 and below.

Figure 2:
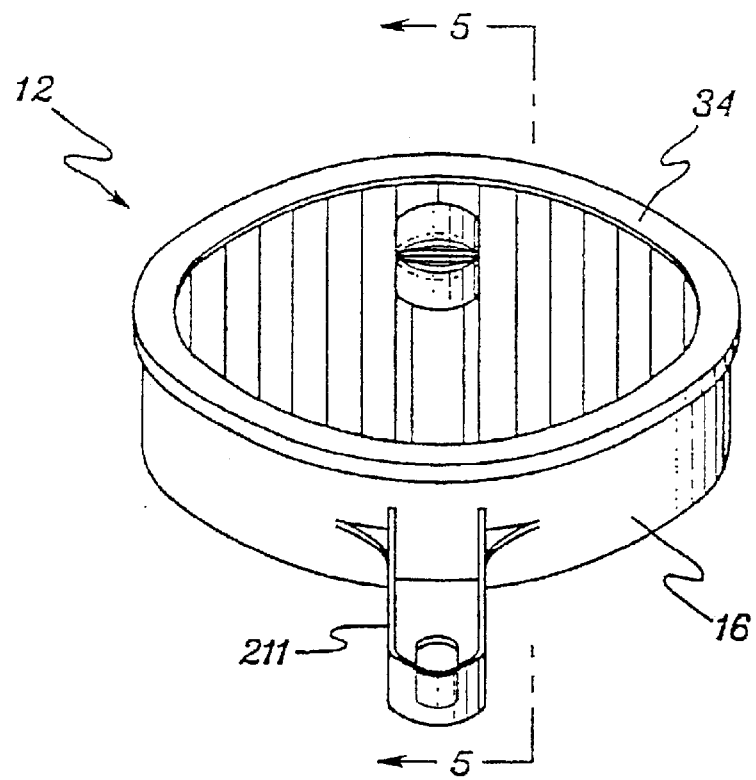
FIG. 2 is a perspective view of the biological fluid filter device depicted in FIG. 1.
Figure 3:
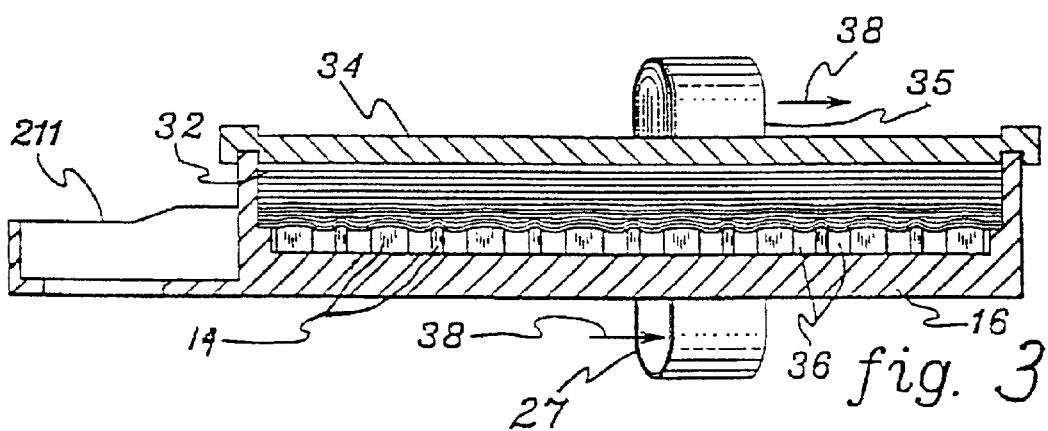
FIG. 3 is a cross-sectional view, taken along line 5—5 of the assembled filter device depicted in FIG. 2.
Figure 4:
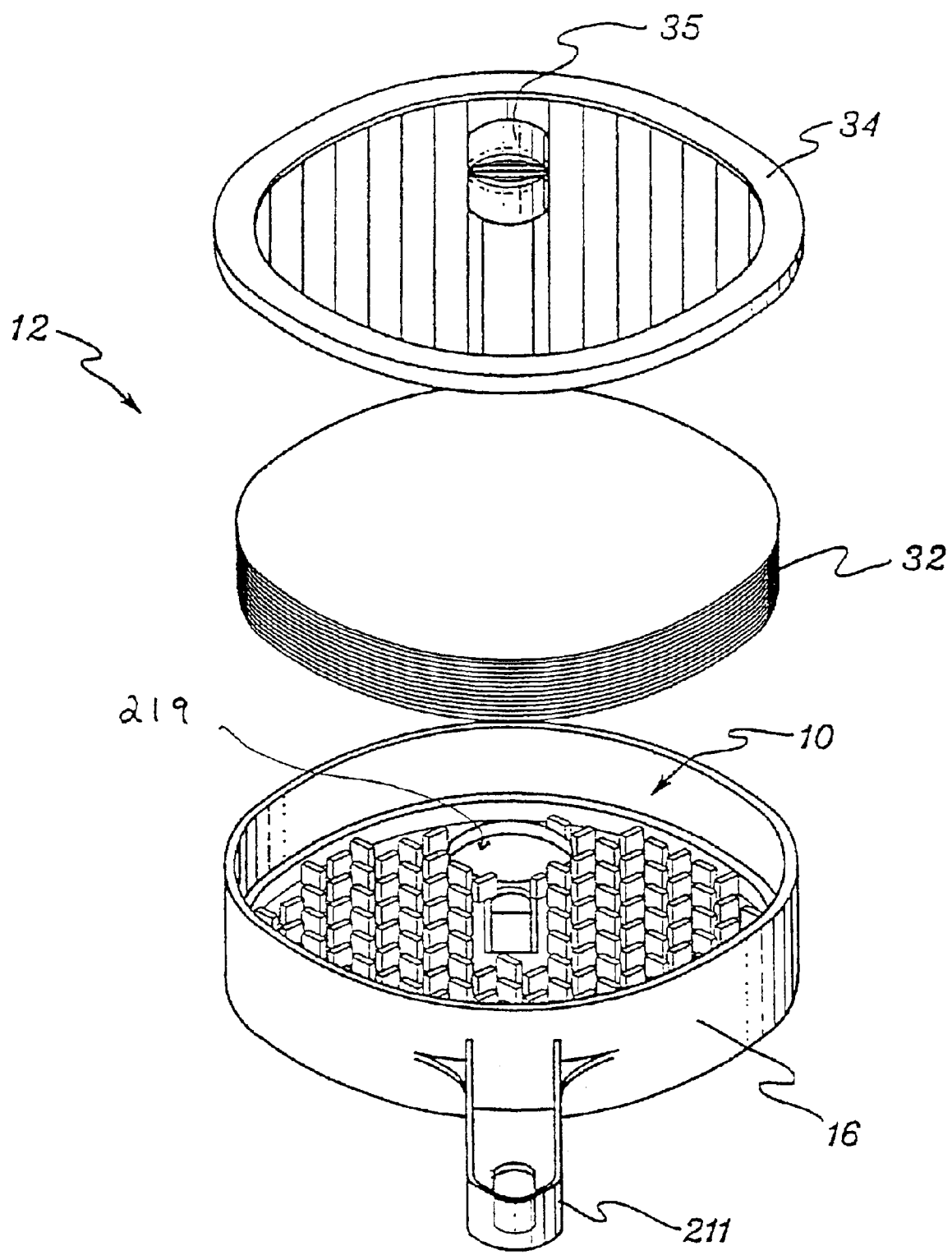
FIG. 4 is an exploded view of the assembled filter device depicted in FIG. 2.

Referring to FIG. 1, a filtration device 12 including the filtration media of the present invention is depicted in operational assembly. The filtration device 12 includes inlet tubing 217, outlet tubing 218, blood supply bag 293, receiving bag 294, air bag 295, inlet tube clamp 266, outlet tube clamp 267, and air tube clamp 268. Such a system will preferably be purchased sterilized (without blood supply bag 293), with the inlet end of inlet tubing 217 sealed to maintain system sterility. Filtration device 12 is further depicted in FIGS. 2–4. FIG. 2 depicts the assembled device; FIG. 3 is a cross-sectional view of the assembled device taken along line 5—5. FIG. 4 is an exploded view of the assembled device.

Referring again to the Figures, filtration device 12 comprises a filter housing 16 having an inlet port 27 and an outlet port 35. The filter housing may be achieved for example, by molding, such as by plastic injection molding or the like, as well known in the art. The housing may further include a tubing guide 211, a flow distributor 10, which includes supporting members 14 (separated by spaces 36), and a closure member 34. Disposed within filter housing 16 between supporting members 14 and closure member 34 are multiple layers of filtration media. The filtration media may include one or more layers of prefilter medium which may remove gels and/or microaggregates, followed by one or more layers of leukocyte reduction filtration medium for removing leukocytes and a particle trap which may include one or more layers of media capable of trapping debris or solids that may be present in the filtrate stream.

Although modem filter materials are produced to high levels of quality, it is conceivable that minute quantities of particulate matters (e.g. fibers) may be dislodged either as a result of local microscopic non-uniformities, or due to shock or vibration during shipping or handling. The use of a particle trap may therefore be desirable to safeguard the filtered blood product. Such a particle trap may comprise layers of the same or different materials, which are present as discrete layers, or as a composite of multiple layers. The properties of the single or multiple layers used in the particle trap depend on the nature of the particular matter released, e.g., fibrous or granular. In certain cases a layer of screen material suffices; in other cases depth filters are called for; in yet other instances a combination of these attributes are desired to ensure thorough removal of all significant particulates.

In a preferred embodiment, the particle trap component comprises a layer of a thin polyester screen (e.g. Hollytex 3242, Reemay, Old Hickory, Tenn.), a layer of nonwoven polyester depth filter such as a wet-laid polyethylene terephthalate (PET) medium (e.g. Freudenberg FO5124), and a third layer of thin polyester screen such as a spunbound polybutylene terephthalate (PBT) medium (e.g. Johns Manville Type 2195-129). This type of particle trap may be effective in removing a variety of fibrous or particulate matters, yet offer little resistance to the passage of the leukocyte-reduced red blood cells. Thus, in a preferred embodiment of the complete filter assembly, the filtration media disposed within the filter device comprises a layer of needle-punched fabric (such as, for example, Reemay Grade 5600) for removing microaggregates, seven layers of filtration media according to the present invention, for removing leukocytes, and finally a three-layered particle trap, as described above.

In such an embodiment, the prefilter medium may have a mean flow pore size (MFP) within the range of about 40 to 150 $\mu$m, preferably of about 40 to 100 $\mu$m; the leukocyte reduction filtration media may have an MFP within the range of about 5 to 15 $\mu$m, preferably of about 9 $\mu$m; and the final particle catch media may have an MFP within the range of about 5 and 20 $\mu$m. The preferred MFP of the final particle will depend upon the biological product being filtered. For example, where leukocyte depleted red blood cells are the desired end product, an MFP of 5 $\mu$m or higher may be preferred, and where leukocyte depleted platelets are the desired end product, an MFP of 7 $\mu$m or higher may be preferred. The particle trap media should have depth filtration properties and be effective in removing extraneous debris and solids from the filtrate stream, while allowing red blood cells to flow freely through the media without hemolysis.

Referring again to FIGS. 1 and 3, filtration may be performed as follows. Inlet tubing clamp 266 is opened so that gravity forces the blood product to flow from blood supply bag 293, through inlet tubing 217, through inlet port 27 of upstream side 26, through the space 36, sequentially through the prefilter medium, the leukocyte reduction medium and the debris-trapping medium, into the outlet port 35 of closure member 34, into outlet tubing 218 to receiving bag 294. Filtration will continue until supply bag 293 is empty, whereby it collapses, closing the inlet end of inlet tubing 217. When filtration ceases and the flow of liquid stops, air may enter the system through a vent 219, if desired, to help drain the system.

This invention has been described in terms of specific embodiments, set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

We claim:

1. A filtration media for depleting leukocytes from leukocyte-containing blood products, said filtration media comprising a matrix of fibers and a plurality of components having a specific surface area of at least 100 m$^2$/g distributed amongst the fibers, wherein the weight ratio of the components distributed amongst the matrix of fibers to the matrix of fibers is less than or equal to about 1:100.

2. The filtration media of claim 1, wherein the specific surface area of the components distributed amongst the matrix of fibers is at least 120 m$^2$/g.

3. The filtration media of claim 1, wherein the components distributed amongst the matrix of fibers are highly fibrillated fibers or particles comprised of a polyacrylonitrile copolymer.

4. The filtration media of claim 1, wherein the components distributed amongst the matrix of fibers are highly fibrillated fibers or particles comprised of an acrylonitrile vinyl acetate copolymer.

5. The filtration media of claim 1, wherein the components distributed amongst the matrix of fibers are highly fibrillated fibers or particles having an average diameter of less than 0.05 µm.

6. The filtration media of claim 1, further comprising a binder.

7. The filtration media of claim 6, wherein the binder is polyvinyl alcohol or a cross-linked derivative thereof.

8. A method for depleting leukocytes from leukocyte-containing blood products, said method comprising passing the blood product through a leukocyte reduction filtration media comprised of a matrix of fibers and a plurality of components having a specific surface area of at least 100 m$^2$/g distributed amongst the fibers, wherein the weight ratio of the components distributed amongst the matrix of fibers to the matrix of fibers is less than or equal to about 1:100; and recovering a leukocyte-depleted blood product.

9. The method of claim 8, wherein the specific surface area of the components distributed amongst the matrix of fibers is at least 120 m$^2$/g.

10. The method of claim 8, wherein the components distributed amongst the matrix of fibers are highly fibrillated fibers or particles comprised of a polyacrylonitrile copolymer.

11. The method of claim 8, wherein the components distributed amongst the matrix of fibers are highly fibrillated fibers or particles comprised of an acrylonitrile vinyl acetate copolymer.

12. The method of claim 8, wherein the filtration medium further comprises a binder.

13. The method of claim 12 wherein the binder is polyvinyl alcohol or a cross-linked derivative thereof.

14. A filtration media for depleting leukocytes from a constant volume of leucocyte-containing blood products, said filtration media comprising a matrix of fibers and a plurality of components having a specific surface area greater than 100 m$^2$/gm distributed amongst the matrix of fibers wherein use of said filtration media removes at least 99.99% of the leukocytes from the blood products.

15. The filtration media of claim 14 wherein the weight ratio of the high specific surface area components distributed amongst the matrix of fibers to the matrix of fibers is less than or equal to about 1:100.

16. The filtration media of claim 14 wherein the weight ratio of the high specific area components distributed amongst the matrix of fibers to the matrix of fibers is less than about 1:150.

17. The filtration media of claim 14 wherein the weight ratio of the high specific area components distributed amongst the matrix of fibers to the matrix of fibers is less than about 1:200.

18. The filtration media of claim 14 wherein the matrix of fibers comprises glass fibers.

19. The filtration media of claim 14 wherein the components distributed amongst the matrix of fibers are highly fibrillated fibers or particles.

20. The filtration media of claim 19, wherein the surface area of the highly fibrillated fibers or particles is at least 120 m$^2$/gm.

21. The filtration media of claim 19 wherein the highly fibrillated fibers or particles are comprised of a polyacrylonitrile copolymer.

22. The filtration media of claim 19 wherein the highly fibrillated fibers or particles comprise an acrylonitrile vinyl acetate copolymer.

23. The filtration media of claim 19 wherein the highly fibrillated fibers or particles have an average diameter of less than 0.05 µm.

24. The filtration media of claim 14, further comprising a binder.

25. The filtration media of claim 24 wherein the binder is polyvinyl alcohol or a cross-linked derivative thereof.

26. A filtration media for depleting leukocytes from a constant volume of leukocyte-containing blood products, said filtration media comprising a matrix of glass fibers; a plurality of polyacrylonitrile copolymer highly fibrillated fibers or particles having a specific surface area of at least 120 m$^2$/gm distributed amongst the glass fibers; and a binder comprised of polyvinyl alcohol or a cross-linked derivative thereof.

27. A method for depleting leukocytes from a constant volume of leukocyte-containing blood products, said method comprising passing the blood product through a leukocyte reduction filtration media comprised of a matrix of fibers and a plurality of high specific surface area components distributed amongst the matrix of fibers having a specific surface area greater than 100 m$^2$/gm; removing at least 99.99% of the leukocytes from the blood product; and recovering a leukocyte-depleted blood product.

28. The method of claim 27 wherein the high specific surface area components distributed amongst the matrix of fibers are highly fibrillated fibers or particles.

29. The method of claim 28 wherein the specific surface area of the highly fibrillated fibers or particles is at least 120 m$^2$/gm.

30. The method of claim 28 wherein the highly fibrillated fibers or particles are comprised of a polyacrylonitrile copolymer.

31. The method of claim 28 wherein the highly fibrillated fibers or particles comprise an acrylonitrile vinyl acetate copolymer.

32. The method of claim 27 wherein the matrix of fibers comprise glass fibers.

33. The method of claim 27 wherein the weight ratio of the high specific surface area components distributed amongst the matrix of fibers to the matrix of fibers is less than or equal to about 1:100.

34. The method of claim 33 wherein the weight ratio of the components distributed amongst the matrix of fibers to the matrix fibers is less than about 1:150.

35. The method of claim 27 wherein the filtration medium further comprises a binder.

36. The method of claim 35 wherein the binder is polyvinyl alcohol or a cross-linked derivative thereof.

37. A filter device for depleting leukocytes from a constant volume of leukocyte-containing blood products, said device comprising a housing having an inlet and an outlet and having one or more layers of leukocyte depletion filtration media disposed therein, said media comprising a matrix of fibers and a plurality of high components distributed amongst the matrix of fibers having a specific surface area greater than 100 m$^2$/gm wherein use of said filtration device removes 99.99% of the leukocytes from the blood products.

38. The filter device of claim 37 further comprising one or more layers of a prefilter media disposed within said housing upstream from said leukocyte depletion filtration media.

39. The filter device of claim 38 further comprising a particle trap is disposed within said housing downstream from said leukocyte depletion filtration media.

40. The filter device of claim 39 wherein the leukocyte depletion filtration media is comprised of a matrix of glass fibers and the high specific surface area components comprise a plurality of highly fibrillated polyacrylonitrile copolymer fibers and a binder.

41. The filter device of claim 40 wherein the binder is polyvinyl alcohol or a cross-linked derivative thereof.

42. The filter device of claim 40 wherein the prefilter media comprises a material capable of filtering gels.

43. The filter device of claim 41 wherein the prefilter medium comprises a needle-punched fabric, and wherein the particle trap comprises at least one layer of a polyester screen and at least one layer of a nonwoven fibrous web.

44. The filter device of claim 43 wherein the particle trap comprises at least one layer of a wet-laid polyethylene terephthalate medium and at least one polyester screen.

45. A filter device for depleting leukocytes from a constant volume of leukocyte-containing blood products comprising:
  a housing having an inlet and an outlet and having one or more layers of leukocyte depletion filtration media disposed therein, said media comprising a matrix of fibers and a plurality of components having a specific surface area of at least 120 $m^2$/gm distributed amongst the matrix of fibers wherein during use said filtration media removes at least 99.99% of leukocytes from the blood products;
  a prefilter, located upstream of said one or more layers of leukocyte depletion media, having a layer of needle punched fabric; and
  a particle trap located downstream of said one or more layers of leukocyte depletion media, having a first thin polyester screen, a layer of non-woven polyester, and a second thin polyester screen.

46. A method for depleting leukocytes from leukocyte-containing blood products, said method comprising passing the blood product through a leukocyte reduction filtration media comprised of a matrix of fibers and a plurality of components having a specific surface area of at least 100 $m^2$/g distributed amongst the matrix of fibers, wherein the weight ratio of the components distributed amongst the matrix fibers to the matrix of fibers is less than or equal to about 1:100; removing at least 99.99% of the leukocytes from the blood product; and recovering a leukocyte-depleted blood product.

47. The method of claim 46, wherein the specific surface area of the components distributed amongst the matrix of fibers is at least 120 $m^2$/g.

48. The method of claim 46, wherein the components distributed amongst the matrix of fibers are highly fibrillated fibers or particles comprised of a polyacrylonitrile copolymer.

49. The method of claim 46, wherein the components distributed amongst the matrix of fibers are highly fibrillated fibers or particles comprised of an acrylonitrile vinyl acetate copolymer.

50. The method of claim 46, wherein the filtration medium further comprises a binder.

51. The method of claim 50 wherein the binder is polyvinyl alcohol or a cross-linked derivative thereof.

* * * * *